(12) United States Patent
Aggarwal et al.

(10) Patent No.: US 11,790,695 B1
(45) Date of Patent: Oct. 17, 2023

(54) ENHANCED VIDEO ANNOTATION USING IMAGE ANALYSIS

(71) Applicant: Amazon Technologies, Inc., Seattle, WA (US)

(72) Inventors: Abhinav Aggarwal, New Delhi (IN); Yash Pandya, Navi Mumbai (IN); Laxmi Shivaji Ahire, Malegaon (IN); Lokesh Amarnath Ravindranathan, Bangalore (IN); Manivel Sethu, Bangalore (IN); Muhammad Raffay Hamid, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 234 days.

(21) Appl. No.: 17/322,753

(22) Filed: May 17, 2021

(51) Int. Cl.
  *G06K 9/00* (2022.01)
  *H04N 21/44* (2011.01)
  *G06F 16/78* (2019.01)
  *G06F 16/75* (2019.01)
  *G06F 16/783* (2019.01)
  *G06V 40/16* (2022.01)
  *G06V 20/40* (2022.01)
  *G06F 18/23* (2023.01)
  *G06F 18/21* (2023.01)

(52) U.S. Cl.
  CPC ........ *G06V 40/173* (2022.01); *G06F 18/2178* (2023.01); *G06F 18/23* (2023.01); *G06V 20/40* (2022.01); *G06V 40/179* (2022.01)

(58) Field of Classification Search
  CPC ...... G06F 16/738; G06F 16/75; G06F 16/784; G06F 16/7867; G06V 20/46; G06V 40/167; G06V 40/172; H04N 21/23418; H04N 21/26603; H04N 21/44008; H04N 21/84; H04N 21/8456
  See application file for complete search history.

(56) References Cited

U.S. PATENT DOCUMENTS

| | | | |
|---|---|---|---|
| 11,151,386 B1 * | 10/2021 | Aggarwal | H04N 21/84 |
| 2012/0106806 A1 * | 5/2012 | Folta | G06V 40/173 |
| | | | 382/118 |
| 2018/0173959 A1 * | 6/2018 | Shah | G06V 40/168 |

* cited by examiner

*Primary Examiner* — Michael J Vanchy, Jr.
(74) *Attorney, Agent, or Firm* — Eversheds Sutherland (US) LLP

(57) ABSTRACT

Devices, systems, and methods are provided for enhanced video annotations using image analysis. A method may include identifying, by a first device, first faces of first video frames, and second faces of second video frames. The method may include determining a first score for the first video frames, the first score indicative of a first number of faces to label, the first number of faces represented by the first video frames, and determining a second score for the second video frames, the second score indicative of a second number of faces to label. The method may include selecting the first video frames for face labeling, and receiving a first face label for the first face. The method may include generating a second face label for the second faces. The method may include sending the first face label and the second face label to a second device for presentation.

20 Claims, 10 Drawing Sheets

ENHANCED VIDEO ANNOTATION USING IMAGE ANALYSIS

BACKGROUND

People increasingly want more information with their entertainment, such as information about television shows and movies that people watch. Some video viewers may desire to know which actors are present in a video that the viewers are watching. However, television shows and movies may have many video frames to analyze when identifying the presence of an actor, and some actors may not be identifiable in the video frames.

Figure 1:
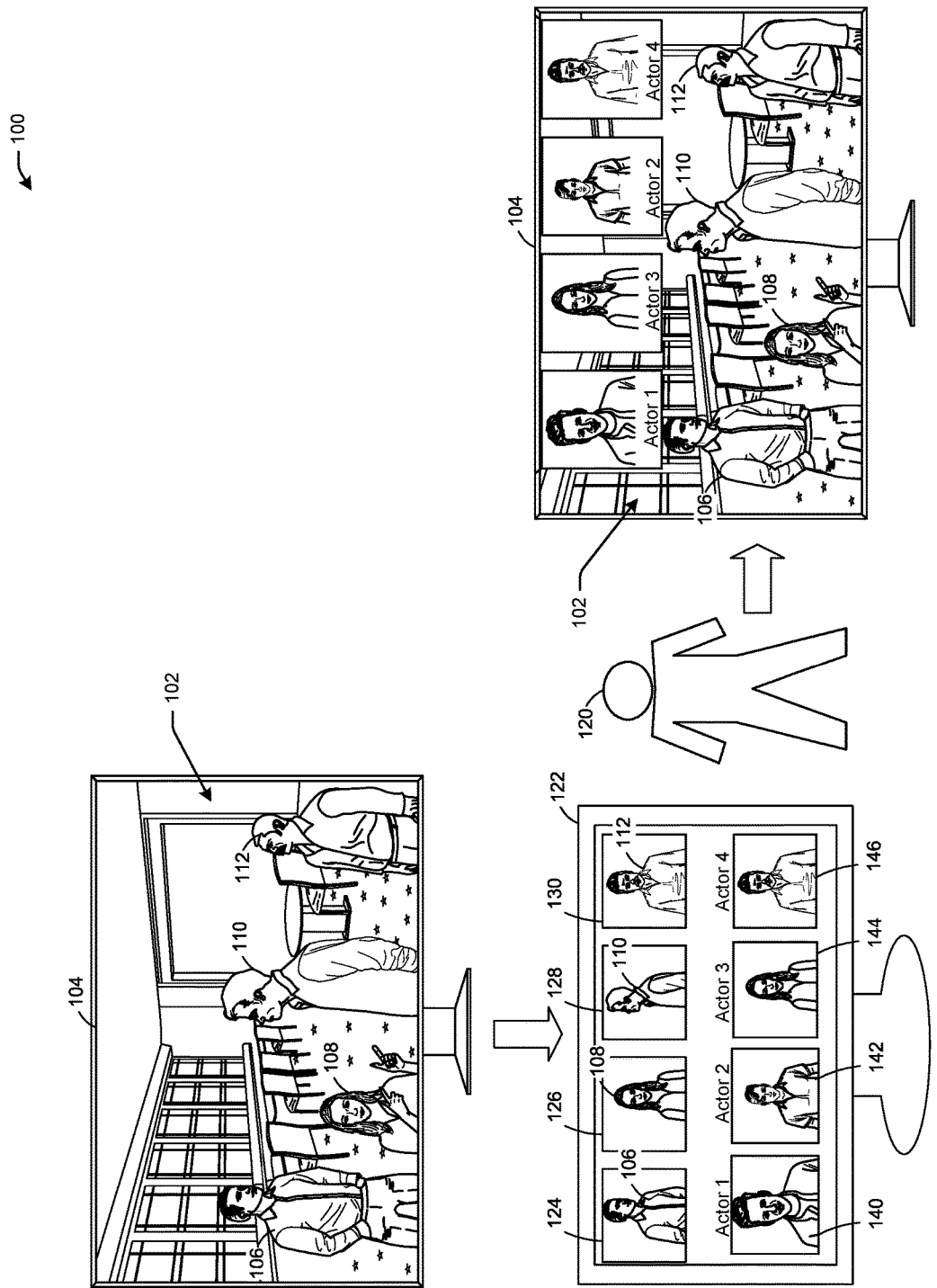
FIG. 1 illustrates an example system for video annotations using image analysis, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for video annotations using image analysis.

Some video services may provide information to viewers to supplement video programming. For example, while watching a television show or movie, a person may want to see which actors are present in the video. Such supplemental information presented with the video may enhance a viewer's experience.

As video services expand their video selections, the volume of video to analyze to identify supplemental information such as actor presence becomes burdensome to analyze manually. Some automated and semi-automated processes may analyze video to identify supplemental information. However, to analyze many video frames for the presence of actors in the video frames may be inefficient even when automated. For example, some image analysis techniques may rely on facial matching of actors' faces identified in video frames to pre-selected images of the actors (e.g., actor headshots).

Some image analysis techniques, such as those used for photographs, may group and label faces identified in the images by grouping faces into clusters and interactively labeling the clusters (e.g., by the actor represented by images in the clusters). However, video such as television episodes and movies represent different challenges than existing photograph clustering techniques, as a large number of video frames may present occlusions, blurs, after effects, shot changes, face masks, and the like. There may be significant redundancy and spatial coherence between respective video frames, so performance of existing image analysis and labeling techniques may be inefficient when scaled to a large number of video frames. Therefore, rather than identifying a few faces and face clusters, it may be beneficial to identify a maximum number of people (e.g., to account for any actor appearance in any video title) and label any actor without a significant processing burden when automating the actor identification and labeling.

Some techniques may use a reference image (e.g., an actor headshot photo) to detect and identify actors in video titles. However, the relationship between name and headshot is one to many, whereas the relationship between headshot to name is one to one. There also is no guarantee of an actor having a suitable headshot, especially when accounting for the many actors in video titles around the world. In addition, a same actor may have multiple different appearances in a video title, such as one without mask or makeup, one with a mask or makeup, etc. Human labelers may need to identify a suitable actor headshot to use for automating the process of identifying an actor in video frames, which may be difficult, time consuming, and may require a legal clearance.

For example, the total time $T_{season}$ required to time-code a season of television may be represented by:

$$T_{Total} = \sum\nolimits_{i=0}^{n} T_{add} + \sum\nolimits_{i=0}^{k} \sum\nolimits_{i=0}^{p} T_{identify} + T_{watch} + T_{others}, \quad (1)$$

where $T_{add}$ is the time spent on adding an actor instance, n is the number of actor instances to be labelled in a season, k is the total number of episodes in a season, p is the average number of actor instances in an episode, $T_{identify}$ is time spent on identifying the person to be time placed, $T_{watch}$ is the time spent on watching the content to verify the actor occurrence, and $T_{others}$ is time spent on adding actor headshot. $T_{watch}$ is directly related to the length of the content. $T_{identify}$ is a dominant factor. In a season with k episodes, a system may need to spend a total of $k*p*T_{identify}$ time to identify an actor in every episode of a television show.

In addition, some techniques may prompt human operators to match all identified faces from video frames with known actor headshots, a process that may be time consuming and inefficient.

There is therefore a need for enhanced actor annotation techniques using image analysis.

In one or more embodiments, enhanced actor annotation techniques using image analysis may generate a small set of faces identified in video frames and may invoke human touch points to label some actors in an efficient and inexpensive manner. A system may use the manual inputs to propagate the cast actor labels from very few (e.g., tens) faces to large (e.g., thousands) sets of faces. The potential of a face to label other faces may be measured by the number of unlabeled faces that the system may label without requiring further human operator touch points.

In one or more embodiments, for video frames sampled at a frame rate, a system may use computer-based image analysis, such as a multi-task cascaded convolutional neural networks, to localize faces in sampled video frames. The system may use a model (e.g., FaceNet) to generate facial features used to compare faces across multiple video frames. The system may use a triplet loss to reduce the facial embeddings distance of similar faces and to increase the facial embeddings distance for dissimilar faces. For example, a facial embedding may refer to a vector representing extracted features from a face identified in an image. By comparing vectors of identified faces, a system may determine a distance between the vectors, and therefore the faces.

In one or more embodiments, the system may use clustering, such as multi-step clustering, impact-based clustering, and a face-ranking algorithm. The system may cluster faces from a video into a finite set of clusters, and may apply a series of intra-cluster optimizations to select representative faces for any cluster (e.g., a representative face of an actor in a cluster of similar faces). Using inter-cluster matching, the system may remove duplicate clusters representing the same actor. For example, the system may use agglomerative clustering across the video frames, treating each face as a singleton cluster. Pairs of clusters having the closest distance to one another may be merged. To identify a similar set of actors in multiple clusters (e.g., duplicates), the system may use spatio-temporal information, such as intersection-over-union (IoU) and a frame time stamp difference. The system may represent each face group with a single representation (e.g., optimal face representation-OFR). A facial embeddings distance may indicate a cosine similarity between the OFRs, and the system may group similar OFRs (e.g., having a cosine similarity below a threshold similarity) as a single OFR. The system again may use the facial embeddings distance on the OFRs for each cluster to identify unique faces. Using density-based spatial clustering of applications with noise (DBSCAN), the system may group points that are close to one another based on a distance measurement and a minimum number of points. Some redundancies may result, so a human operator may verify that any actor has only one face (e.g., headshot). In this manner, the comparison of clusters may result in the identification of clusters having images of a same actor so that only one image of the actor is selected for further identification of the actor in other video frames.

In one or more embodiments, not all faces may be important enough to be labeled. For example, in some videos, a skewed set of people appear more frequently than other people. When labeling a small number of faces, a large fraction of screen presence may be covered, and the system may rank generated faces based on screen presence. The system may use the OFSs to identify a face from a face group to be labeled, and human-labeled faces may be used to propagate the labels to other faces in the group.

In one or more embodiments, not all face embeddings determined from the faces of the same person may have a cosine similarity less than the threshold similarity. For example, facial embeddings may be weak for dark images, side views of a face, and blurry faces. To account for this problem, the system may replace the set of faces with a single embedding for forward propagation. The system may use a heuristic based on facial brightness, face pose, and/or face size, and may rank all faces of a set based on the heuristic to identify a representative image of an actor's face. The system may select an optimal face of an actor using a hybrid solution, such as FaceQNet, for face quality estimation, and FSANet for face pose, along with a face brightness metric. In this manner, even when image clusters of a same actor are not similar enough for a computer to identify as the same actor, the heuristic may allow for the system to select one representative face of an actor.

In one or more embodiments, once an optimal face has been selected for an actor, the actor identification and labeling may be optimized for movies and seasons of television. The system may apply the large-scale clustering algorithm described above to any video title, and human operators may annotate some faces. A television season, for example, may have a significant overlap of the cast list across multiple episodes (e.g., the main characters may appear in many episodes). The system may reduce the redundancy of labeling the same actor over and over in each episode by processing a complete season (e.g., all episodes of one television season) at once using the large-scale clustering algorithm. However, processing a complete season at once may present a scaling challenge for a large number of videos, may result in a higher change of errors and a longer labeling time, and may result in missing shorter actor appearances (e.g., cameos). Instead, the system may process episodes individually, allowing for multiprocessing using the existing large-scale clustering algorithm, and reducing the labeling time and chances of missing cameo appearances. The system may reduce the redundancy in labeling by using face labels from already annotated episodes to label faces in remaining episodes. The system may process all titles before generating an annotation job for human operators, and after selecting a first annotation job for human operators, the system may use the face labels from the first annotation job to generate a second annotation job. Once the second annotation job is complete, the system may use the face labels from the first two annotation jobs to create additional annotation jobs, one at a time until a complete season has been annotated.

In one or more embodiments, after individually processing video titles using the large-scale clustering algorithm, the system may select a first episode to be annotated for a television season. The first annotation job does not need to have any pre-labeled faces available. The system may identify a set of faces to be labeled once an episode has been labeled. The system may apply heuristic scoring to select a first episode: 1) The percentage of faces which would have a predicted label once the selected episode is labeled, 2) The percentage of unlabeled faces that could be labeled based on the labeled faces, and 3) The number of faces in the first labeling job. In this manner, the system may match the faces from any episode with the other episodes of the season, and then select the episode whose faces have the maximum potential to label remaining faces from the season. While making this selection, the system may avoid selecting episodes with exceptionally high number of faces to label. The jobs may be easier to annotate when some faces are already labeled using the previously annotated jobs. To select an episode as the first episode for analysis, the system may label the episode having the most overlap with other episodes. The system may perform matching of faces in all episodes of a season, identify episodes having a high potential to label faces in other episodes, and select an episode with fewer actors present.

In one or more embodiments, after the first job is annotated, the system may select one of the remaining episodes for annotation, and may identify which episodes the remaining episode may be clubbed with to generate annotation jobs. The system may combine (e.g., merge) episodes which have a high overlap in the cast list together, ensuring that the individual annotation jobs remain easy for the manual operators. To avoid errors, human operators may verify faces with a predicted label as a verification task, which may be faster than the face-labeling task as long as the number of incorrect faces presented to the human operators is small.

In one or more embodiments, the system may use a face-generating component to generate, from the video frames, faces that need labeling, and a manual annotation user interface component that facilitates the human operator annotation jobs. The system may be implemented using serverless computing to allow for elasticity. For example, large-scale clustering algorithm may be implemented by a batch computing service that may dynamically provision computer resources (e.g., processing, instances, etc.) without a requirement to install and manage batch computing software on a device. After the large-scale clustering algorithm has completed processing of a video title and generated the faces to be labeled, the faces may persist in scalable object storage, and the system may generate and send a notification to human operators regarding a new annotation job with the faces. In new annotation jobs, the system automatically may tag a majority of the faces by matching them with the tagged faces from any jobs which are already completed. The identities of the automatically tagged faces may be verified by the human operators, saving time while still ensuring that the system remains accurate. The dynamic way of generating annotation jobs ensures that operators efficiently may tag a complete television season without any loss of accuracy. The process adapts itself for different types of seasons. For example, some shows have jobs with 5-10 episodes annotated together in a single job in negligible time, whereas, some shows have 1 or 2 episodes per job when there is very low overlap in the cast list of the episodes. Annotating a single annotation job for the complete season as a single large job is not feasible for the manual operators as the cast size reaches the order of hundreds, for example. After the tagging for the faces from an episode is complete, a final step may include a quality audit of any actor occurrences in the video. This is the $T_{watch}$ factor in Equation (1) above and is usually much less than the runtime as operators effectively may audit occurrences watching video at three to four times the speed.

In one or more embodiments, as a result of the enhanced identification and labeling using computer vision and machine learning have optimized on repeating cast list by identifying an actor just once instead of k times. For other instances, we perform an optional simple verification which takes negligible time compared to $T_{identify}$. The system may be optimized according to the following equation:

$$T_{Total} = \sum_{i=0}^{n} T_{add} + \sum_{i=0}^{p} T_{identify} + T_{watch} + T_{others}. \quad (2)$$

For example, for a season of a television show having 24 episodes with a repeating cast list, the system may save the time and resources required to identify the same actor (e.g., $T_{identify}$) for all but one episode, resulting in up to 24× time savings for $T_{identify}$ required for repeating actors. Test results show that the system may provide more than 10% throughput being enabled, a 4.35× reduction in time spent on the user interface tool for television seasons, and enabling human operators for 3.76 seasons in the same time needed to manually enable one season.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example system 100 for video annotations using image analysis, in accordance with one or more example embodiments of the present disclosure.

Referring to FIG. 1, the system 100 may include a video frame 102 (e.g., an image) displayed using a device 104. The video frame 102 may be one of multiple video frames representing a video program, such as a movie, television show, or the like. The video frames may include representations of one or multiple characters. As shown, the video frame 102 may include representations of an actor 106, an actor 108, an actor 110, and an actor 112. It may be desirable to present to a viewer of the video (e.g., an audience) supplemental information such as the names of the actors presented at any given time. However, the actors presented in any given video frame at a time may not be known.

Still referring to FIG. 1, a human operator 120 may be presented with images of the actors represented by the video frames (e.g., faces of the actors presented in the video frame 102). A device 122 may present images of faces identified in the video frame 102. For example, an image 124 may show the face of the actor 106, an image 126 may show the face of the actor 108, an image 128 may show the face of the actor 110, and an image 130 may show the face of the actor 112, but the images 124-130 may be unlabeled (e.g., the actors of the images 124-130 may be unknown). The human operator 120 may have access to facial images of actors in the video frames of which the video frame 102 is a frame. The human operator 120 may match the images 124-130 with images of the corresponding actor to label the images 124-130 (and therefore identify the actors 106-112). For example, the human operator may match the actor 106 in the image 124 with Actor 1 in an image 140. The human operator may match the actor 110 in the image 128 with Actor 2 in an image 142. The human operator may match the actor 108 in the image 126 with Actor 3 in an image 144. The human operator may match the actor 112 in the image 130 with Actor 4 in an image 146. Based on the matching of actors, the device 122 may label the images 124-130 with the actor name represented by the images (e.g., Actors 1-4).

Still referring to FIG. 1, the labels for the images 124-130 may be used to annotate the video frame 102. Accordingly, the device 104 may present the video frame 102 with the actor's names as supplemental information. As shown, the image 140 may be shown along with the name Actor 1 for the actor 106 in the video frame 102. The image 144 may be shown along with the name Actor 3 for the actor 108 in the video frame 102. The image 142 may be shown along with the name Actor 2 for the actor 110 in the video frame 102. The image 146 may be shown along with the name Actor 4 for the actor 112 in the video frame 102.

In one or more embodiments, the system 100 may use enhanced actor annotation techniques using image analysis to generate a small set of faces (e.g., represented by the images 124-130) identified in video frames (e.g., the video frame 102) and may invoke human touch points to label some actors. The system 100 may use the manual inputs to propagate the cast actor labels from very few (e.g., tens) faces to large (e.g., thousands) sets of faces. The potential of a face to label other faces may be measured by the number of unlabeled faces that the system may label without requiring further human operator touch points.

In one or more embodiments, for video frames sampled at a frame rate, the system 100 may use computer-based image analysis, such as a multi-task cascaded convolutional neural networks, to localize faces in sampled video frames (e.g., the video frame 102). The system 100 may use a model (e.g., FaceNet) to generate facial features used to compare faces across multiple video frames. The system 100 may use a triplet loss to reduce the facial embeddings distance of similar faces and to increase the facial embeddings distance for dissimilar faces.

Figure 3:
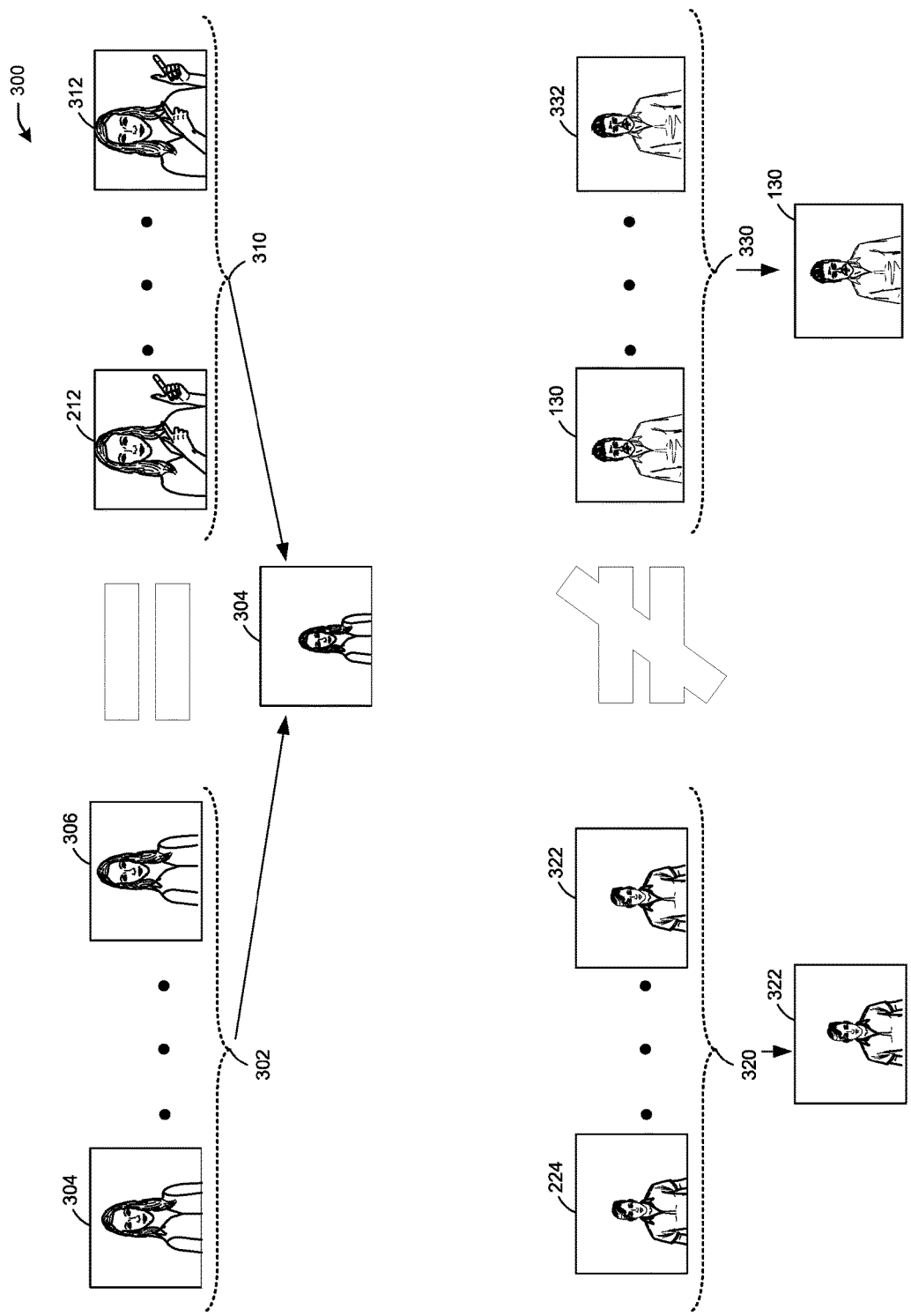
FIG. 3 illustrates example image clusters used for video annotations using image analysis, in accordance with one or more example embodiments of the present disclosure.

In one or more embodiments, the system 100 may use clustering, such as multi-step clustering, impact-based clustering, and a face-ranking algorithm. The system 100 may cluster faces (e.g., as shown in FIG. 3) from a video into a finite set of clusters, and may apply a series of intra-cluster optimizations to select representative faces for any cluster (e.g., a representative face of an actor in a cluster of similar faces). Using inter-cluster matching, the system 100 may remove duplicate clusters representing the same actor. For example, the system 100 may use agglomerative clustering across the video frames, treating each face as a singleton cluster. Pairs of clusters having the closest distance to one another may be merged. To identify a similar set of actors in multiple clusters (e.g., duplicates), the system 100 may use spatio-temporal information, such as intersection-over-union (IoU) and a frame time stamp difference. The system 100 may represent each face group with a single representation (e.g., optimal face representation-OFR). A facial embeddings distance may indicate a cosine similarity between the OFRs, and the system 100 may group similar OFRs (e.g., having a cosine similarity below a threshold similarity) as a single OFR. The system 100 again may use the facial embeddings distance on the OFRs for each cluster to identify unique faces. Using density-based spatial clustering of applications with noise (DBSCAN), the system 100 may group points that are close to one another based on a distance measurement and a minimum number of points. Some redundancies may result, so the human operator 120 may verify that any actor has only one face (e.g., headshot). In this manner, the comparison of clusters may result in the identification of clusters having images of a same actor so that only one image of the actor is selected for further identification of the actor in other video frames.

In one or more embodiments, not all faces may be important enough to be labeled. For example, in some videos, a skewed set of people appear more frequently than other people. When labeling a small number of faces, a large fraction of screen presence may be covered, and the system 100 may rank generated faces based on screen presence. The system 100 may use the OFSs to identify a face from a face group to be labeled, and human-labeled faces may be used to propagate the labels to other faces in the group.

In one or more embodiments, not all face embeddings determined from the faces of the same person may have a cosine similarity less than the threshold similarity. For example, facial embeddings may be weak for dark images, side views of a face, and blurry faces. To account for this problem, the system 100 may replace the set of faces with a single embedding for forward propagation. The system 100 may use a heuristic based on facial brightness, face pose, and/or face size, and may rank all faces of a set based on the heuristic to identify a representative image of an actor's face. The system 100 may select an optimal face of an actor (e.g., the faces shown in the images 140-146) using a hybrid solution, such as FaceQNet, for face quality estimation, and FSANet for face pose, along with a face brightness metric. In this manner, even when image clusters of a same actor are not similar enough for a computer to identify as the same actor, the heuristic may allow for the system to select one representative face of an actor.

In one or more embodiments, once an optimal face has been selected for an actor, the actor identification and labeling may be optimized for movies and seasons of television. The system 100 may apply the large-scale clustering algorithm described above to any video title, and human operators may annotate some faces. A television season, for example, may have a significant overlap of the cast list across multiple episodes (e.g., the main characters may appear in many episodes). The system 100 may reduce the redundancy of labeling the same actor over and over in each episode by processing a complete season (e.g., all episodes of one television season) at once using the large-scale clustering algorithm. However, processing a complete season at once may present a scaling challenge for a large number of videos, may result in a higher change of errors and a longer labeling time, and may result in missing shorter actor appearances (e.g., cameos). Instead, the system 100 may process episodes individually, allowing for multiprocessing using the existing large-scale clustering algorithm, and reducing the labeling time and chances of missing cameo appearances. The system 100 may reduce the redundancy in labeling by using face labels from already annotated episodes to label faces in remaining episodes. The system 100 may process all titles before generating an annotation job for human operators, and after selecting a first annotation job for human operators, the system 100 may use the face labels from the first annotation job to generate a second annotation job. Once the second annotation job is complete, the system 100 may use the face labels from the first two annotation jobs to create additional annotation jobs, one at a time until a complete season has been annotated.

In one or more embodiments, after individually processing video titles using the large-scale clustering algorithm, the system 100 may select a first episode to be annotated for a television season. The first annotation job does not need to have any pre-labeled faces available. The system 100 may identify a set of faces to be labeled once an episode has been labeled. The system 100 may apply heuristic scoring to select a first episode: 1) The percentage of faces which would have a predicted label once the selected episode is labeled, 2) The percentage of unlabeled faces that could be labeled based on the labeled faces, and 3) The number of faces in the first labeling job. In this manner, the system 100 may match the faces from any episode with the other episodes of the season, and then select the episode whose faces have the maximum potential to label remaining faces from the season. While making this selection, the system 100 may avoid selecting episodes with exceptionally high number of faces to label. The jobs may be easier to annotate when some faces are already labelled using the previously annotated jobs. To select an episode as the first episode for analysis, the system 100 may label the episode having the most overlap with other episodes. The system 100 may perform matching of faces in all episodes of a season, identify episodes having a high potential to label faces in other episodes, and select an episode with fewer actors present.

In one or more embodiments, after the first job is annotated, the system 100 may select one of the remaining episodes for annotation, and may identify which episodes the remaining episode may be clubbed with to generate annotation jobs. The system 100 may combine (e.g., merge) episodes which have a high overlap in the cast list together, ensuring that the individual annotation jobs remain easy for the manual operators. To avoid errors, human operators (e.g., the human operator 120) may verify faces with a predicted label as a verification task, which may be faster than the face-labeling task as long as the number of incorrect faces presented to the human operators is small.

In one or more embodiments, the system 100 may use a face-generating component to generate, from the video frames, faces that need labeling, and a manual annotation user interface component that facilitates the human operator annotation jobs. The system 100 may be implemented using serverless computing to allow for elasticity. For example, large-scale clustering algorithm may be implemented by a batch computing service that may dynamically provision computer resources (e.g., processing, instances, etc.) without a requirement to install and manage batch computing software on a device. After the large-scale clustering algorithm has completed processing of a video title and generated the faces to be labeled, the faces may persist in scalable object storage, and the system may generate and send a notification to human operators regarding a new annotation job with the faces. In new annotation jobs, the system automatically may tag a majority of the faces by matching them with the tagged faces from any jobs which are already completed. The identities of the automatically tagged faces may be verified by the human operators, saving time while still ensuring that the system remains accurate. The dynamic way of generating annotation jobs ensures that operators efficiently may tag a complete television season without any loss of accuracy. The process adapts itself for different types of seasons. For example, some shows have jobs with 5-10 episodes annotated together in a single job in negligible time, whereas, some shows have 1 or 2 episodes per job when there is very low overlap in the cast list of the episodes. Annotating a single annotation job for the complete season as a single large job is not feasible for the manual operators as the cast size reaches the order of hundreds, for example. After the tagging for the faces from an episode is complete, a final step may include a quality audit of any actor occurrences in the video. This is the $T_{watch}$ factor in Equation (1) above and is usually much less than the runtime as operators effectively may audit occurrences watching video at three to four times the speed.

In one or more embodiments, as a result of the enhanced identification and labeling using computer vision and machine learning have optimized on repeating cast list by identifying an actor just once instead of k times. For other instances, we perform an optional simple verification which takes negligible time compared to $T_{identify}$. The system may be optimized according to Equation (2) above. Test results show that the system may provide more than 10% throughput being enabled, a 4.35× reduction in time spent on the user interface tool for television seasons, and enabling human operators for 3.76 seasons in the same time needed to manually enable one season.

In one or more embodiments, the device 104 and/or the devices 122 may include a personal computer (PC), a wearable wireless device (e.g., bracelet, watch, glasses, ring, etc.), a desktop computer, a mobile computer, a laptop computer, an ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like.

Figure 2:
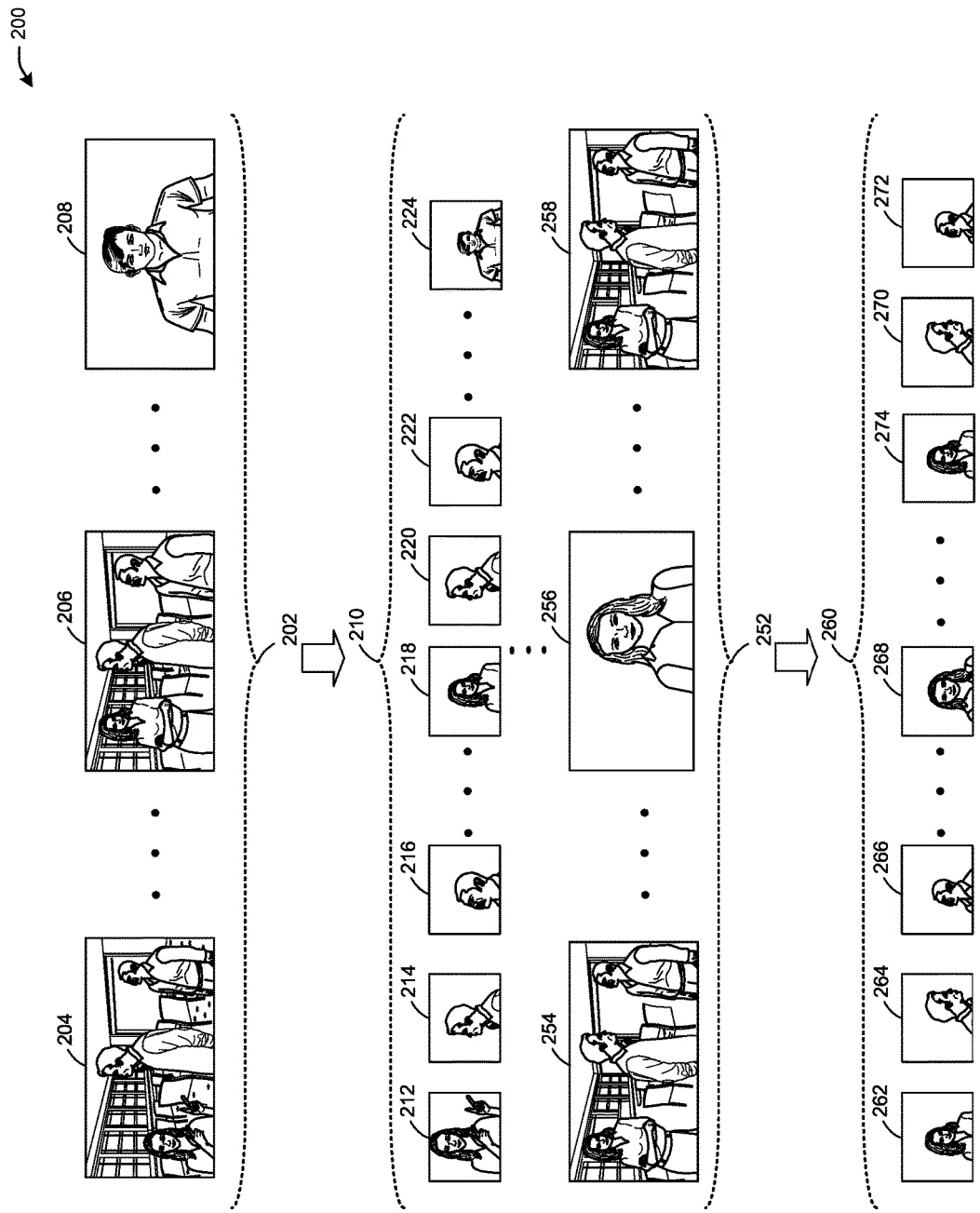
FIG. 2 illustrates example video frames used for video annotations using image analysis, in accordance with one or more example embodiments of the present disclosure.

FIG. 2 illustrates example video frames 200 used for video annotations using image analysis, in accordance with one or more example embodiments of the present disclosure.

Referring to FIG. 2, the video frames 200 may include video frames 202, such as video frame 204, video frame 206, and video frame 208, among others. The video frames 202 may represent an episode of a television show. From the video frames 202, the system 100 of FIG. 1 may identify images 210 of actors' faces. For example, the video frames 202 may include an image 212, an image 214, an image 216, an image 218, an image 220, an image 222, and an image 224. The image 212 and the image 218 may represent the same actor in different video frames (e.g., the video frames 204 and 206). The image 214 and the image 220 may represent the same actor in different video frames (e.g., the video frames 204 and 206). The image 216 and the image 222 may represent the same actor in different video frames (e.g., the video frames 204 and 206). The image 224 may represent an actor in the video frame 208. In this manner, some of the video frames 202 may show representations of multiple actors at a time, and some of the video frames 202 may show representations of a single actor at a time.

Still referring to FIG. 2, the video frames 200 may include video frames 252, such as video frame 254, video frame 256, and video frame 258, among others. The video frames 252 may represent another episode of a television show (e.g., a different episode of the same television show as the video frames 202). From the video frames 252, the system 100 of FIG. 1 may identify images 260 of actors' faces. For example, the video frames 252 may include an image 262, an image 264, an image 266, an image 268, an image 270, an image 272, and an image 274. The image 262, the image 268, and the image 274 may represent the same actor in different video frames (e.g., the video frames 254, 256, and 258). The image 264 and the image 270 may represent the same actor in different video frames (e.g., the video frames 254 and 258). The image 266 and the image 272 may represent the same actor in different video frames (e.g., the video frames 254 and 258). In this manner, some of the video frames 252 may show representations of multiple actors at a time, and some of the video frames 252 may show representations of a single actor at a time.

In one or more embodiments, when the video frames 202 are sampled at a frame rate, the system 100 of FIG. 1 may use computer-based image analysis, such as a multi-task cascaded convolutional neural networks, to localize faces in the sampled video frames. The system 100 may use a model (e.g., FaceNet) to generate facial features used to compare faces across multiple video frames. The system 100 may use a triplet loss to reduce the facial embeddings distance of similar faces and to increase the facial embeddings distance for dissimilar faces. For example, a facial embedding may refer to a vector representing extracted features from a face identified in an image. By comparing vectors of identified faces, the system 100 may determine a distance between the vectors, and therefore the faces.

FIG. 3 illustrates example image clusters 300 used for video annotations using image analysis, in accordance with one or more example embodiments of the present disclosure.

Referring to FIG. 3, the clusters 300 may be based on the faces identified in the video frame 102 of FIG. 1 and the video frames 200 of FIG. 2. As shown, an image cluster 302 may include images 304-306 (e.g., representing the actor 108 of FIG. 1 based on facial similarity). An image cluster 310 may include image 212 of FIG. 2—image 312 (e.g., representing the actor 108 of FIG. 1 based on facial similarity). An image cluster 320 may include image 224 of FIG. 2—image 322 (e.g., representing the actor 110 of FIG. 1 based on facial similarity). An image cluster 330 may include image 130 of FIG. 1—image 332 (e.g., representing the actor 112 of FIG. 1 based on facial similarity). The system 100 of FIG. 1 may analyze the image clusters to determine whether any image clusters show the same actor. For example, the system 100 may determine that the image cluster 302 represents the same actor as the cluster 310. From any image cluster, the system 100 may select an optimal facial image to use to represent the actor of the image cluster. For example, the system 100 may select the image 304 for the image clusters 302 and 310, may select the image 322 for the image cluster 320, and may select the image 130 for the image cluster 330.

In one or more embodiments, the system 100 may use clustering, such as multi-step clustering, impact-based clustering, and a face-ranking algorithm. The system 100 may cluster faces from a video into a finite set of clusters (e.g., the clusters 302, 310, 320, and 332), and may apply a series of intra-cluster optimizations to select representative faces for any cluster (e.g., the image 304, the image 322, and the image 130). Using inter-cluster matching, the system 100 may remove duplicate clusters representing the same actor (e.g., the image clusters 302 and 310). For example, the system 100 may use agglomerative clustering across the video frames, treating each face as a singleton cluster. Pairs of clusters having the closest distance to one another may be merged (e.g., the image clusters 302 and 310). To identify a similar set of actors in multiple clusters (e.g., duplicates), the system 100 may use spatio-temporal information, such as intersection-over-union (IoU) and a frame time stamp difference. The system 100 may represent each face group with a single representation (e.g., optimal face representation-OFR). A facial embeddings distance may indicate a cosine similarity between the OFRs, and the system 100 may group similar OFRs (e.g., having a cosine similarity below a threshold similarity) as a single OFR. The system 100 again may use the facial embeddings distance on the OFRs for each cluster to identify unique faces. Using density-based spatial clustering of applications with noise (DBSCAN), the system 100 may group points that are close to one another based on a distance measurement and a minimum number of points. In this manner, the comparison of clusters may result in the identification of clusters having images of a same actor so that only one image of the actor is selected for further identification of the actor in other video frames.

In one or more embodiments, not all face embeddings determined from the faces of the same person may have a cosine similarity less than the threshold similarity. For example, facial embeddings may be weak for dark images, side views of a face, and blurry faces. To account for this problem, the system 100 may replace the set of faces with a single embedding for forward propagation. The system 100 may use a heuristic based on facial brightness, face pose, and/or face size, and may rank all faces of a set based on the heuristic to identify a representative image of an actor's face (e.g., the images 304, 322, and 130). The system 100 may select an optimal face of an actor using a hybrid solution, such as FaceQNet, for face quality estimation, and FSANet for face pose, along with a face brightness metric. In this manner, even when image clusters of a same actor are not similar enough for a computer to identify as the same actor, the heuristic may allow for the system 100 to select one representative face of an actor.

Figure 4A:
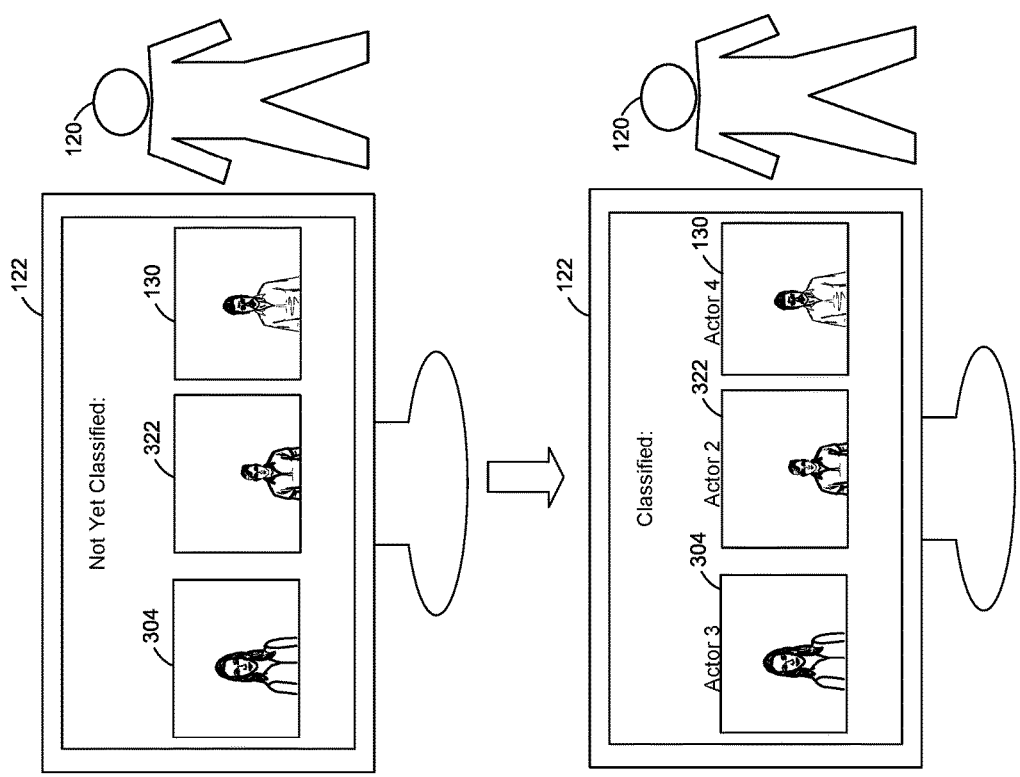
FIG. 4A illustrates example user interfaces used for video annotations using image analysis, in accordance with one or more example embodiments of the present disclosure.

FIG. 4A illustrates example user interfaces 400 used for video annotations using image analysis, in accordance with one or more example embodiments of the present disclosure.

Referring to FIG. 4A, the device 122 of FIG. 1 is shown presenting a user interface with facial images identified from video frames (e.g., the video frame 102 of FIG. 1, the video frames 202 and 252 of FIG. 2). As shown, the images 304 and 322 of FIG. 3, and the image 130 of FIG. 1 are presented as "not yet classified," meaning that the actors represented by the images 304, 322, and 130 have not yet been identified. The human operator 120 of FIG. 1 may classify (e.g., label) the images 304, 322, and 130 by providing the actor names (e.g., of the actors presented) as labels for the images 304, 322, and 332. As shown, the human operator 120 may label the image 304 as representing the Actor 3 of FIG. 1, may label the image 322 as representing the Actor 2 of FIG. 1, and may label the image 130 as representing the Actor 4 of FIG. 1. The images 304, 322, and 130 may be the optimal images selected from FIG. 3 as described above. Once the images 304, 322, and 130 are labeled with actor names, the system 100 of FIG. 1 may use the labels to identify other actors in other video frames.

Figure 4B:
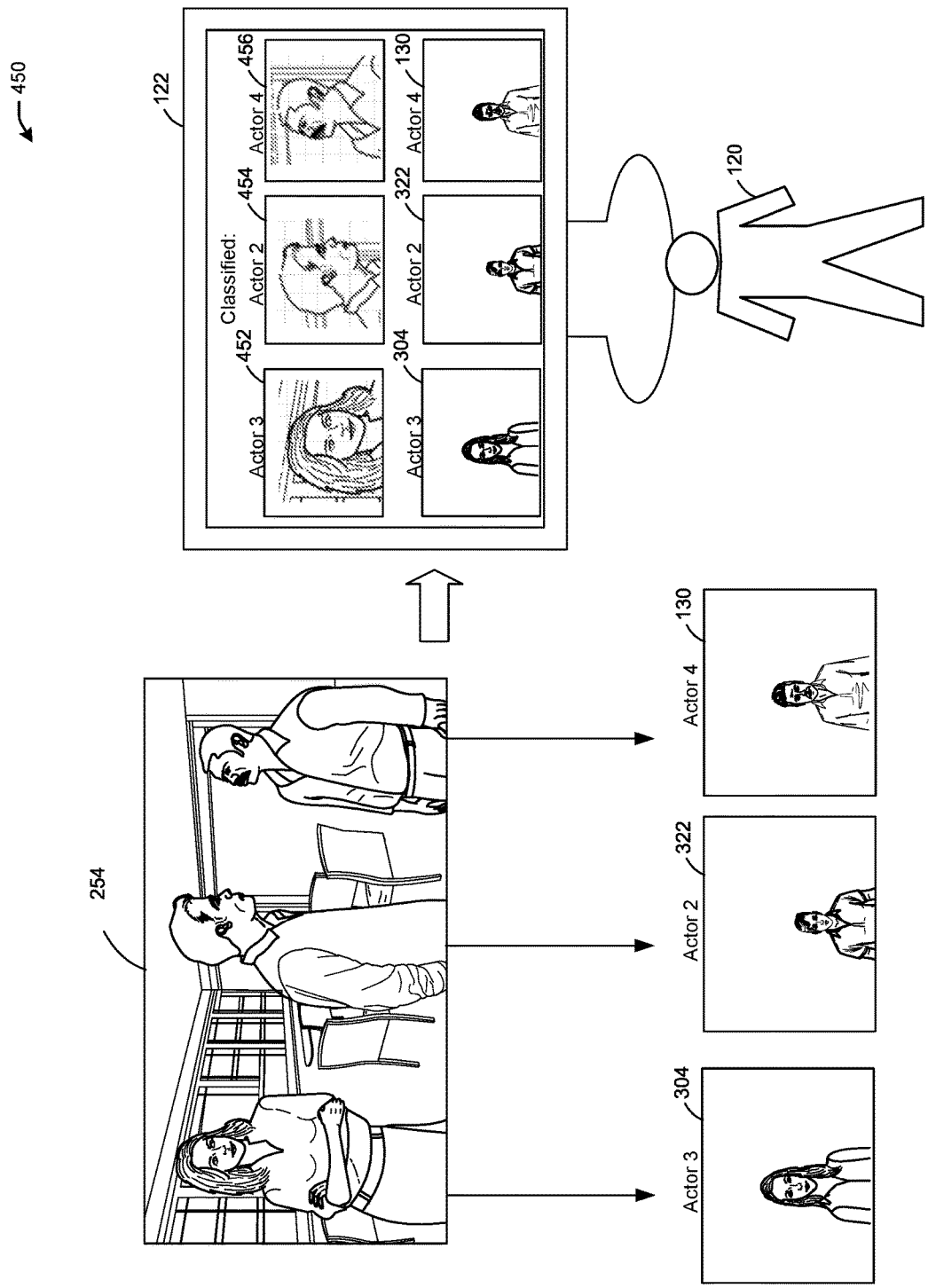
FIG. 4B illustrates an example video frame used for video annotations using image analysis, in accordance with one or more example embodiments of the present disclosure.

FIG. 4B illustrates an example video frame 450 used for video annotations using image analysis, in accordance with one or more example embodiments of the present disclosure.

Referring to FIG. 4B, the video frame 450 used for video annotations using image analysis may be the video frame 254 of FIG. 2. Using the labeled images of FIG. 4A, the system 100 of FIG. 1 may identify the actors present in the video frame 254. For example, the system 100 may identify the Actor 3 based on the image 304, the Actor 2 based on the image 322, and the Actor 4 based on the image 130, and may label image 452, image 454, and image 456 accordingly (e.g., labeling the images with the corresponding actor's name). For example, the system 100 may identify the image 452 of the Actor 3 from the video frame 254, the image 454 of the Actor 2 from the video frame 254, and the image 456 from the video frame 456, and may match the image 452 to the image 304 to label the image 452 as representing the Actor 3, may match the image 454 to the image 322 to label the image 454 as representing the Actor 2, and may match the image 456 to the image 130 to label the image 456 as representing the Actor 4.

Still referring to FIG. 4B, once the system 100 identifies the Actor 3 based on the image 304, the Actor 2 based on the image 322, and the Actor 4 based on the image 130, the system 100 may provide the labeled images 452-456 to the human operator 120 (e.g., using the device 122 of FIG. 1) for manual verification (e.g., confirmation that the actor name labels generated for the labeled images 452-456 were accurate). The human operator 120 may provide a verification of any label, and may replace any incorrect label by providing the correct actor name as a label for a respective image.

In one or more embodiments, once an optimal face has been selected for an actor (e.g., FIG. 3), the actor identification and labeling may be optimized for movies and seasons of television. The system 100 may apply the large-scale clustering algorithm described above to any video title, the human operator 120 of FIG. 1 may annotate some faces. A television season, for example, may have a significant overlap of the cast list across multiple episodes (e.g., the main characters may appear in many episodes). The system 100 may reduce the redundancy of labeling the same actor over and over in each episode by processing a complete season (e.g., all episodes of one television season) at once using the large-scale clustering algorithm. However, processing a complete season at once may present a scaling challenge for a large number of videos, may result in a higher change of errors and a longer labeling time, and may result in missing shorter actor appearances (e.g., cameos). Instead, the system 100 may process episodes individually, allowing for multiprocessing using the existing large-scale clustering algorithm, and reducing the labeling time and chances of missing cameo appearances. The system 100 may reduce the redundancy in labeling by using face labels from already annotated episodes (e.g., the labeled images 304, 322, and 130) to label faces in remaining episodes (e.g., including the video frame 254). The system 100 may process all titles before generating an annotation job for human operators, and after selecting a first annotation job for human operators, the system 100 may use the face labels from the first annotation job e.g., the labeled images 304, 322, and 130) to generate a second annotation job. Once the second annotation job is complete, the system 100 may use the face labels from the first two annotation jobs to create additional annotation jobs, one at a time until a complete season has been annotated.

In one or more embodiments, after individually processing video titles using the large-scale clustering algorithm, the system 100 may select a first episode to be annotated for a television season. The first annotation job does not need to have any pre-labeled faces available (e.g., the "not yet classified" interface of FIG. 4A). The system 100 may identify a set of faces to be labeled once an episode has been labeled. The system 100 may apply heuristic scoring to select a first episode: 1) The percentage of faces which would have a predicted label once the selected episode is labeled, 2) The percentage of unlabeled faces that could be labeled based on the labeled faces, and 3) The number of faces in the first labeling job. In this manner, the system 100 may match the faces from any episode with the other episodes of the season, and then select the episode whose faces have the maximum potential to label remaining faces from the season. While making this selection, the system 100 may avoid selecting episodes with exceptionally high number of faces to label. The jobs may be easier to annotate when some faces are already labeled using the previously annotated jobs. To select an episode as the first episode for analysis, the system 100 may label the episode having the most overlap with other episodes. The system 100 may perform matching of faces in all episodes of a season, identify episodes having a high potential to label faces in other episodes, and select an episode with fewer actors present.

In one or more embodiments, after the first job is annotated, the system 100 may select one of the remaining episodes for annotation, and may identify which episodes the remaining episode may be clubbed with to generate annotation jobs. The system 100 may combine (e.g., merge) episodes which have a high overlap in the cast list together, ensuring that the individual annotation jobs remain easy for the manual operators. To avoid errors, human operators may verify faces with a predicted label as a verification task, which may be faster than the face-labeling task as long as the number of incorrect faces presented to the human operators is small.

In one or more embodiments, the system 100 may use a face-generating component to generate, from the video frames, faces that need labeling (e.g., the "not yet classified" interface of FIG. 4A), and a manual annotation user interface component that facilitates the human operator annotation jobs. The system 100 may be implemented using serverless computing to allow for elasticity. For example, large-scale clustering algorithm may be implemented by a batch computing service that may dynamically provision computer resources (e.g., processing, instances, etc.) without a requirement to install and manage batch computing software on a device. After the large-scale clustering algorithm has completed processing of a video title and generated the faces to be labeled, the faces may persist in scalable object storage, and the system may generate and send a notification to human operators regarding a new annotation job with the faces. In new annotation jobs, the system 100 automatically may tag a majority of the faces by matching them with the tagged faces from any jobs which are already completed (e.g., FIG. 4B). The identities of the automatically tagged faces may be verified by the human operators, saving time while still ensuring that the system remains accurate. The dynamic way of generating annotation jobs ensures that operators efficiently may tag a complete television season without any loss of accuracy. The process adapts itself for different types of seasons. For example, some shows have jobs with 5-10 episodes annotated together in a single job in negligible time, whereas, some shows have 1 or 2 episodes per job when there is very low overlap in the cast list of the episodes. Annotating a single annotation job for the complete season as a single large job is not feasible for the manual operators as the cast size reaches the order of hundreds, for example. After the tagging for the faces from an episode is complete, a final step may include a quality audit of any actor occurrences in the video. This is the $T_{watch}$ factor in Equation (1) above and is usually much less than the runtime as operators effectively may audit occurrences watching video at three to four times the speed.

Figure 4C:
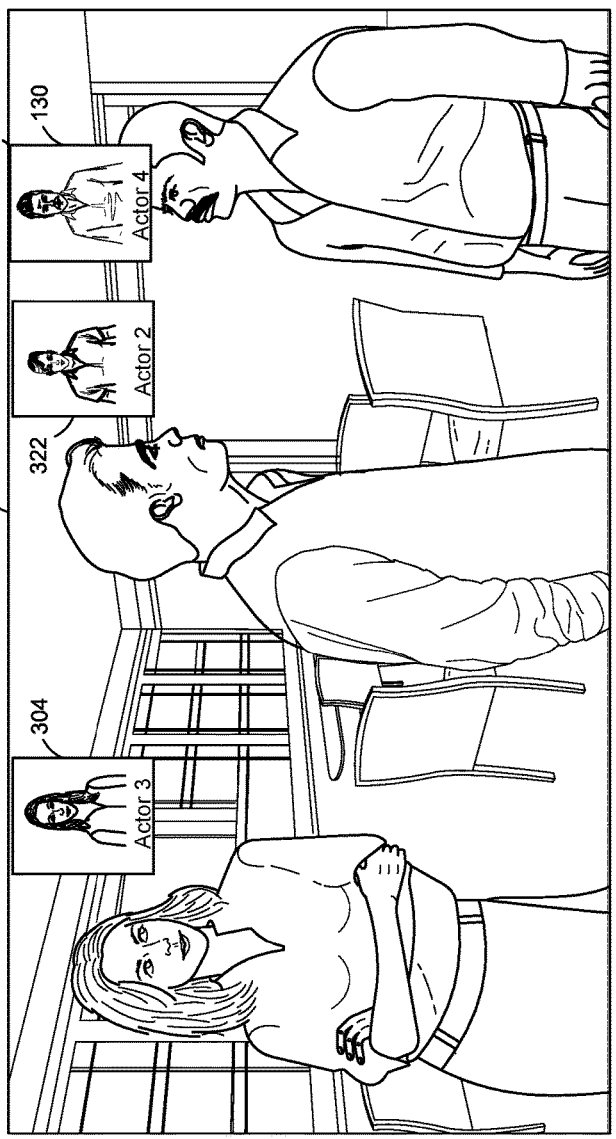
FIG. 4C illustrates an example video frame used for video annotations using image analysis, in accordance with one or more example embodiments of the present disclosure.

FIG. 4C illustrates an example video frame 470 used for video annotations using image analysis, in accordance with one or more example embodiments of the present disclosure.

Referring to FIG. 4C, the video frame 470 may represent an annotated version of the video frame 254 of FIG. 2, showing supplemental information (e.g., the actors present in the video frame 254). As shown, the labeled images 304, 322, and 130 indicate the presence of the Actor 1, the Actor 2, and the Actor 4, respectively, as supplemental information presented concurrently with the video frame 254 to allow a viewer to identify the actors on screen.

Figure 5:
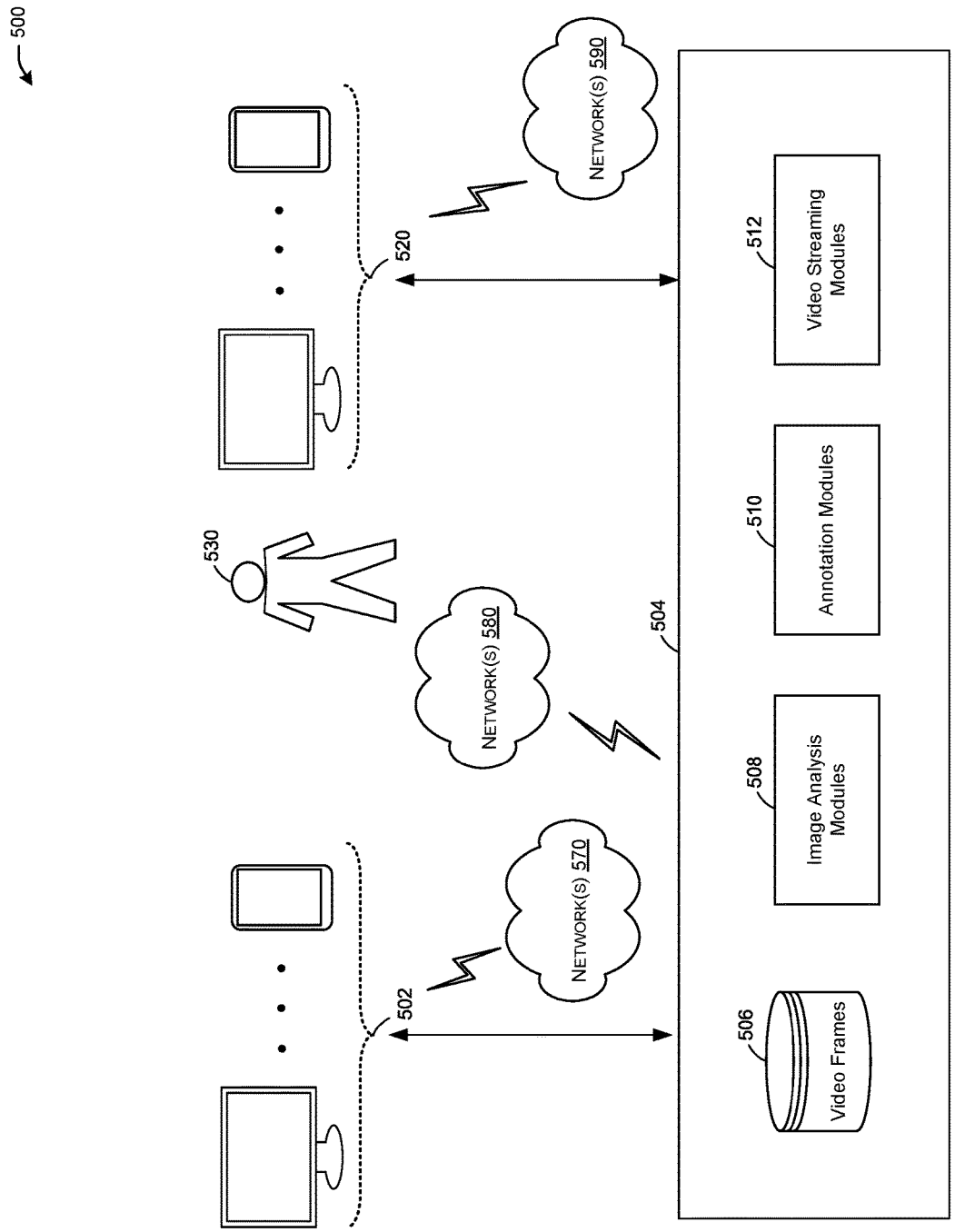
FIG. 5 illustrates an example system for video annotations using image analysis, in accordance with one or more example embodiments of the present disclosure.

FIG. 5 illustrates an example system 500 for video annotations using image analysis, in accordance with one or more example embodiments of the present disclosure.

Referring to FIG. 5, the system 500 may include one or more devices 502 capable of displaying video frames (e.g., the video frame 102 of FIG. 1, the video frames 202 and 252 of FIG. 2). The one or more devices 502 may have access to or otherwise be in communication with one or more remote servers 504 (e.g., cloud-based servers). The one or more remote servers 504 may store video frames 506 (e.g., using data storage), the video frames including the video frame 102 of FIG. 1, the video frames 202 and 252 of FIG. 2. The one or more remote servers 504 may include one or more image analysis modules 508 to perform image analysis, image clustering, and optimal image selection as described above (e.g., using a convolutional neural network, computer vision, or other techniques). The one or more remote servers 504 may include one or more annotation modules 510 used to present images to a human operator to verify which actors are represented by facial images identified from the video frames 506 (e.g., as shown in FIG. 1 and FIG. 4A). The one or more remote servers 504 may include one or more video streaming modules 512 to facilitate streaming of video frames and supplemental information (e.g., by sending the video frames 506 and annotations/labels of actor names to the one or more devices 502 for presentation). The one or more remote servers 504 may send facial images identified from the video frames 506 to one or more devices 502 for presentation to one or more human operators 530 (e.g., as shown in FIG. 1 and in FIG. 4A). The one or more human operators 530 may label facial images by providing the actor names of the actors shown in the images. Some images presented to the one or more human operators 530 may include actor name labels, while others may not.

Any of the one or more devices 502, the one or more remote servers 504, and or the one or more devices 520 may be configured to communicate with each other via one or more communications networks 570, 580, and/or 590 wirelessly or wired. Any of the communications networks 570, 580, and/or 590 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 570, 580, and/or 590 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 570, 580, and/or 590 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Figure 6A:
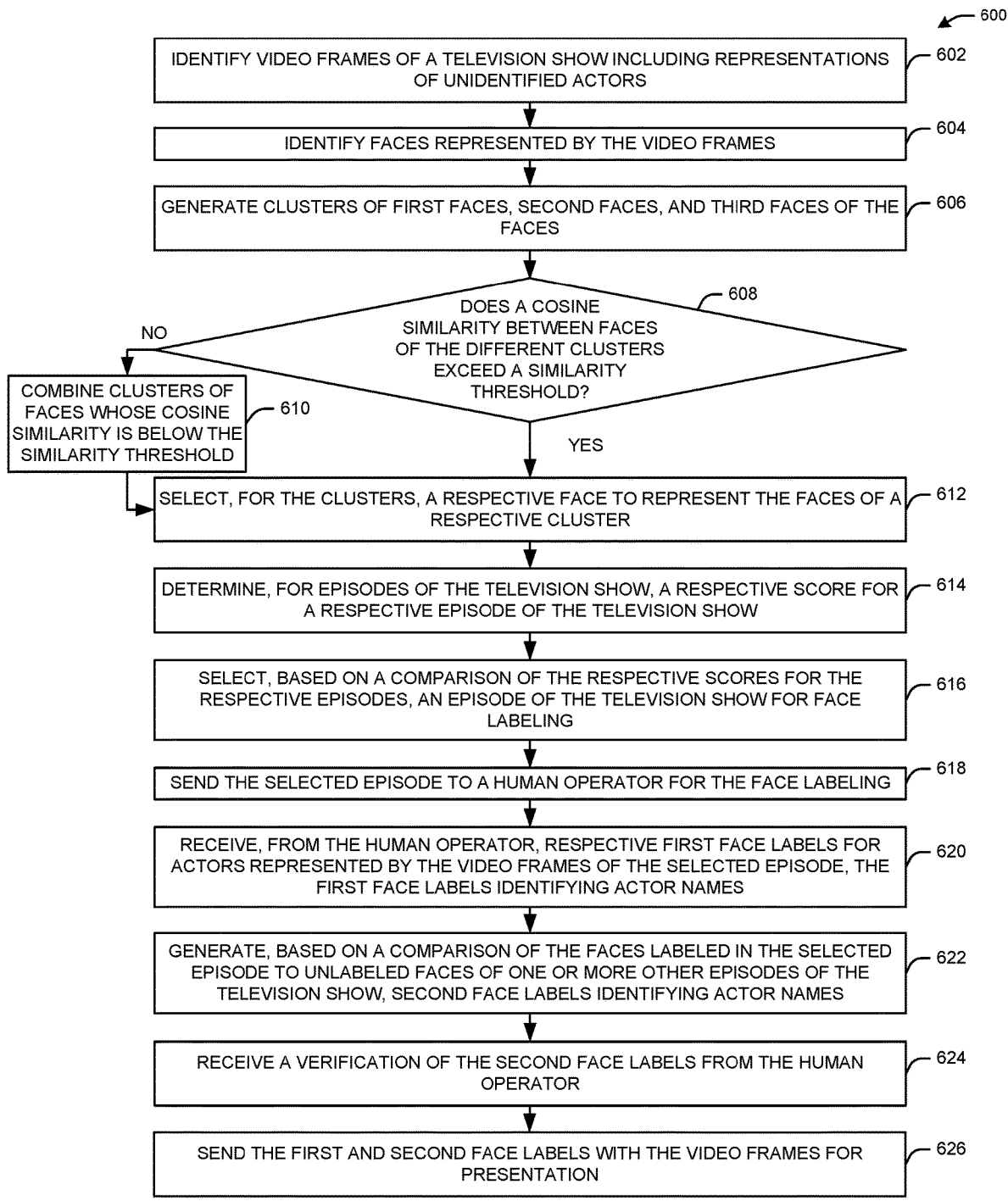
FIG. 6A illustrates a flow diagram for a process for video annotations using image analysis, in accordance with one or more example embodiments of the present disclosure.

FIG. 6A illustrates a flow diagram for a process 600 for video annotations using image analysis, in accordance with one or more example embodiments of the present disclosure.

At block 602, a system (e.g., the system 100 of FIG. 1, the system 500 of FIG. 5) may identify video frames (e.g., the video frame 102 of FIG. 1, the video frames 202 and 252 of FIG. 2, the video frames 506 of FIG. 5) of a television show. The television show may have multiple seasons with multiple episodes. The video frames may include representations of actors (e.g., actors in a scene of the television show). Any video frame may include one or multiple actors. The actors represented by the video frames may be unknown (e.g., unidentified/unlabeled).

At block 604, the system may identify faces represented by the video frames. In one or more embodiments, for video frames sampled at a frame rate, a system may use computer-based image analysis, such as a multi-task cascaded convolutional neural networks, to localize faces in sampled video frames. The system may use a model (e.g., FaceNet) to generate facial features used to compare faces across multiple video frames. The system may use a triplet loss to reduce the facial embeddings distance of similar faces and to increase the facial embeddings distance for dissimilar faces. For example, a facial embedding may refer to a vector representing extracted features from a face identified in an image. By comparing vectors of identified faces, the system may determine a distance between the vectors, and therefore the faces.

At block 606, the system may generate image clusters of faces identified in the video frames (e.g., the image cluster 302 of FIG. 3, the image cluster 310 of FIG. 3, the image cluster 320 of FIG. 3, the image cluster 330 of FIG. 3). In one or more embodiments, the system may use clustering, such as multi-step clustering, impact-based clustering, and a face-ranking algorithm. The system may cluster faces from a video into a finite set of clusters, and may apply a series of intra-cluster optimizations to select representative faces for any cluster (e.g., a representative face of an actor in a cluster of similar faces). Using density-based spatial clustering of applications with noise (DBSCAN), the system may group points that are close to one another based on a distance measurement and a minimum number of points.

At block 608, the system may determine group clusters having similar faces (e.g., representing the same actor). In particular, the system may determine cosine similarity values for the faces in the clusters and compare the cosine similarity values to one another. When the cosine similarity values of two clusters are below a similarity threshold, the process may continue at block 610. When the cosine similarity values of two clusters are above the similarity threshold, the process 600 may continue at block 612. The system may represent each face group with a single representation (e.g., optimal face representation-OFR). A facial embeddings distance may indicate a cosine similarity between the OFRs, and the system may group similar OFRs (e.g., having a cosine similarity below a threshold similarity) as a single OFR. The system again may use the facial embeddings distance on the OFRs for each cluster to identify unique faces. Using density-based spatial clustering of applications with noise (DBSCAN), the system may group points that are close to one another based on a distance measurement and a minimum number of points.

At block 610, the system may combine clusters whose cosine similarity values are below the threshold similarity.

Using inter-cluster matching, the system may remove (e.g., merge) duplicate clusters representing the same actor. For example, the system may use agglomerative clustering across the video frames, treating each face as a singleton cluster. Pairs of clusters having the closest distance to one another may be merged. To identify a similar set of actors in multiple clusters (e.g., duplicates), the system may use spatio-temporal information, such as intersection-over-union (IoU) and a frame time stamp difference. The system may represent each face group with a single representation (e.g., optimal face representation-OFR). A facial embeddings distance may indicate a cosine similarity between the OFRs, and the system may group similar OFRs (e.g., having a cosine similarity below a threshold similarity) as a single OFR. The system again may use the facial embeddings distance on the OFRs for each cluster to identify unique faces. Using density-based spatial clustering of applications with noise (DBSCAN), the system may group points that are close to one another based on a distance measurement and a minimum number of points. Some redundancies may result, so a human operator may verify that any actor has only one face (e.g., headshot). In this manner, the comparison of clusters may result in the identification of clusters having images of a same actor so that only one image of the actor is selected for further identification of the actor in other video frames.

At block 612, the system may select, for any image cluster, a face to represent the cluster (e.g., a representative face of the actor represented by the images in a respective cluster). In one or more embodiments, not all face embeddings determined from the faces of the same person may have a cosine similarity less than the threshold similarity. For example, facial embeddings may be weak for dark images, side views of a face, and blurry faces. To account for this problem, the system may replace the set of faces with a single embedding for forward propagation. The system may use a heuristic based on facial brightness, face pose, and/or face size, and may rank all faces of a set based on the heuristic to identify a representative image of an actor's face. The system may select an optimal face of an actor using a hybrid solution, such as FaceQNet, for face quality estimation, and FSANet for face pose, along with a face brightness metric. In this manner, even when image clusters of a same actor are not similar enough for a computer to identify as the same actor, the heuristic may allow for the system to select one representative face of an actor.

At block 614, the system may determine scores for the episodes of the television show to allow for a selection of which episode's video frames are to be labeled first. The system may select a first episode to be annotated for a television season. The first annotation job does not need to have any pre-labeled faces available. The system may identify a set of faces to be labeled once an episode has been labeled. The system may apply heuristic scoring to select a first episode: 1) The percentage of faces which would have a predicted label once the selected episode is labeled, 2) The percentage of unlabeled faces that could be labeled based on the labeled faces, and 3) The number of faces in the first labeling job. In this manner, the system may match the faces from any episode with the other episodes of the season, and then select the episode whose faces have the maximum potential to label remaining faces from the season. While making this selection, the system may avoid selecting episodes with exceptionally high number of faces to label. The jobs may be easier to annotate when some faces are already labelled using the previously annotated jobs. To select an episode as the first episode for analysis, the system may label the episode having the most overlap with other episodes. The system may perform matching of faces in all episodes of a season, identify episodes having a high potential to label faces in other episodes, and select an episode with fewer actors present. A score may apply to multiple combined episodes. Video frames of multiple episodes may be combined when an episode's cast size (e.g., corresponding to the number of facial clusters identified in the episode's video frames) is below a threshold size, the episode may be combined with another episode for labeling.

At block 616, the system may compare the episode scores to select an episode for face labeling. The episode having the score indication a number of faces having the maximum potential to label remaining faces from the season may be the selected episode. As noted above, the score for any episode may be based on 1) The percentage of faces which would have a predicted label once the selected episode is labeled, 2) The percentage of unlabeled faces that could be labeled based on the labeled faces, and 3) The number of faces in the first labeling job. In this manner, the episode having the score indicating the smallest number of faces to label may be selected (e.g., the number of faces of one episode may be fewer than the number of faces of another episode).

At block 618, the system may send the selected episode to a human operator for face labeling (e.g., as shown in FIG. 1 and in FIG. 4A). At this point, the video frames of the selected episode have unidentified faces of actors. The human operator may be presented with the selected images from the image clusters of the video frames of the episode, and may label the selected images. In this manner, the labeled images used to represent the actors may be images of the actors from the video frames (e.g., rather than headshots found on the Internet). The labels of the actor names for the selected images may be used to compare to video frames of other episodes of the television show.

At block 620, the system may receive, from the human operator, first face labels (e.g., with actor names) for the selected images of the selected episode. The system may process all titles before generating an annotation job for human operators, and after selecting a first annotation job for human operators, the system may use the face labels from the first annotation job to generate a second annotation job. Once the second annotation job is complete, the system may use the face labels from the first two annotation jobs to create additional annotation jobs, one at a time until a complete season has been annotated. In one or more embodiments, after the first job is annotated, the system may select one of the remaining episodes for annotation, and may identify which episodes the remaining episode may be clubbed with to generate annotation jobs. The system may combine (e.g., merge) episodes which have a high overlap in the cast list together, ensuring that the individual annotation jobs remain easy for the manual operators. To avoid errors, human operators may verify faces with a predicted label as a verification task, which may be faster than the face-labeling task as long as the number of incorrect faces presented to the human operators is small.

At block 622, the system may generate, based on a comparison of the first face labels to faces identified in video frames of other episodes of the television show, second face labels identifying actor names. After the large-scale clustering algorithm has completed processing of a video title and generated the faces to be labeled, the faces may persist in scalable object storage, and the system may generate and send a notification to human operators regarding a new annotation job with the faces. In new annotation jobs, the system automatically may tag a majority of the faces by matching them with the tagged faces from any jobs which are already completed. The identities of the automatically tagged faces may be verified by the human operators, saving time while still ensuring that the system remains accurate. The dynamic way of generating annotation jobs ensures that operators efficiently may tag a complete television season without any loss of accuracy. The process adapts itself for different types of seasons. For example, some shows have jobs with 5-10 episodes annotated together in a single job in negligible time, whereas, some shows have one or two episodes per job when there is very low overlap in the cast list of the episodes. Annotating a single annotation job for the complete season as a single large job is not feasible for the manual operators as the cast size reaches the order of hundreds, for example. Video frames of multiple unlabeled episodes may be combined and processed concurrently (e.g., a labeled episode may be used to label multiple episodes combined or a single episode at a time). For example, when an episode's cast size (e.g., corresponding to the number of facial clusters identified in the episode's video frames) is below a threshold size, the episode may be combined with another episode for labeling. When an episode's number of unlabeled facial images is below a threshold number, the episode may be combined with another episode (e.g., when the total unlabeled facial images of the multiple episodes is below the threshold number).

At block 624, the system may send the second face labels and corresponding images to the human operator for verification, and may receive verification from the human operator (e.g., confirming that the second face labels are correct or correcting the second face labels). In this manner, the human operator may verify that the second face labels generated automatically based on the comparison of faces identified in video frames to the first face labels. After the tagging for the faces from an episode is complete, a final step may include a quality audit of any actor occurrences in the video. This is the $T_{watch}$ factor in Equation (1) above and is usually much less than the runtime as operators effectively may audit occurrences watching video at three to four times the speed.

At block 626, the system may send the video frames and face labels to another device (e.g., the one or more devices 502 of FIG. 5) for presentation. For example, the face labels may be presented concurrently with the video frames as supplemental information to identify the actors shown in the video frames.

Figure 6B:
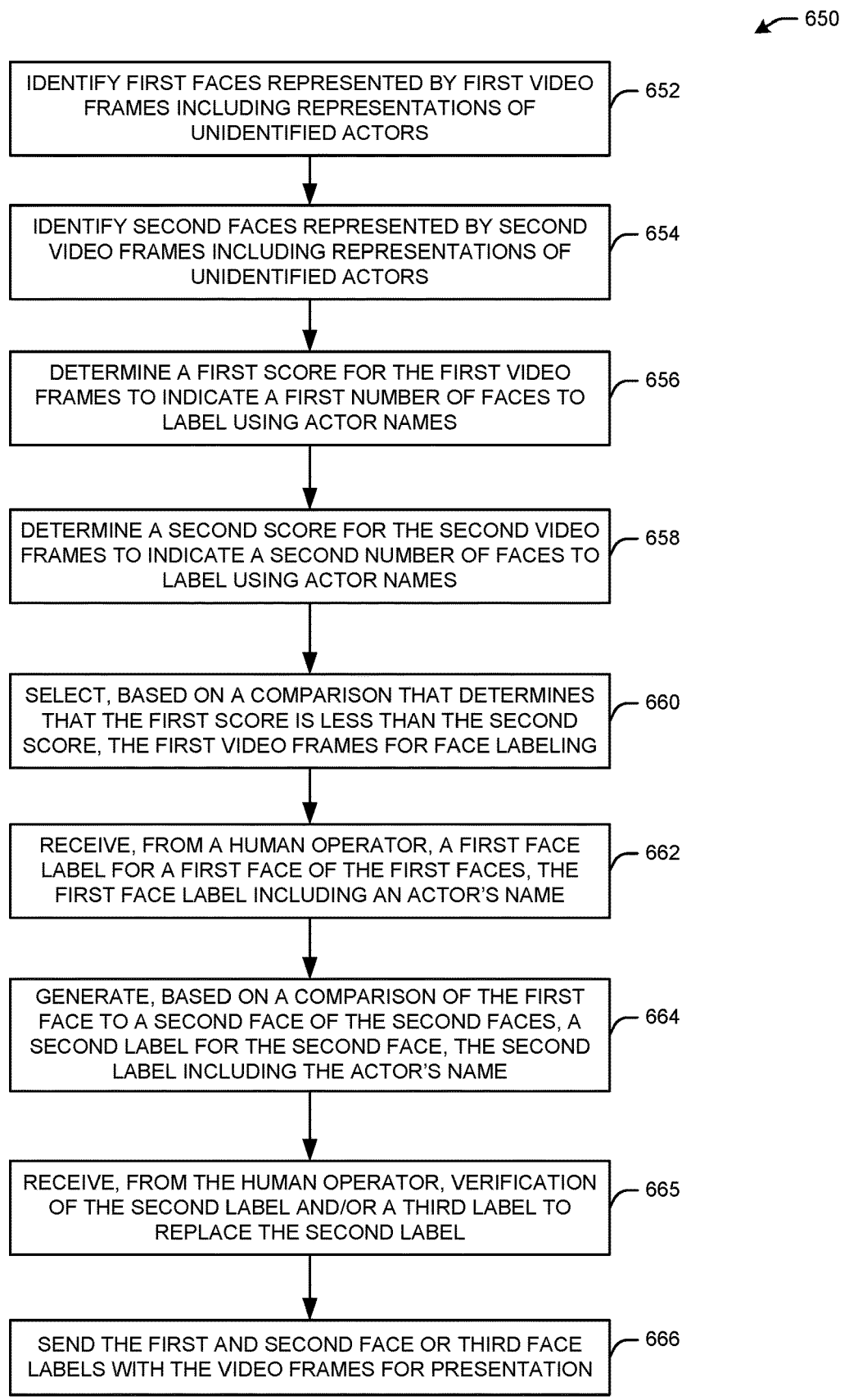
FIG. 6B illustrates a flow diagram for a process for video annotations using image analysis, in accordance with one or more example embodiments of the present disclosure.

FIG. 6B illustrates a flow diagram for a process 650 for video annotations using image analysis, in accordance with one or more example embodiments of the present disclosure.

At block 652, a system (e.g., the system 100 of FIG. 1, the system 500 of FIG. 5) may identify first faces represented by first video frames (e.g., video frames of one or more episodes of a television show). At block 654, the system may identify second faces represented by second video frames (e.g., video frames of a second episode of the television show or a combination the second episode with one or more other episodes). The faces may be the selected faces for image clusters, as described above with respect to block 612 of FIG. 6A. Episodes may be combined with one another when the number of unlabeled faces of the combined video frames of the episodes is below a threshold number of faces.

At block 656, the system may determine a first score for the first video frames. At block 658, the system may determine a second score for the second video frames. The score for any episode may be based on 1) The percentage of faces which would have a predicted label once the selected episode is labeled, 2) The percentage of unlabeled faces that could be labeled based on the labeled faces, and 3) The number of faces in the first labeling job. In this manner, the episode having the score indicating the smallest number of faces to label may be selected (e.g., the number of faces of one episode may be fewer than the number of faces of another episode).

At block 660, the system may select, based on a comparison of the episode scores to one another, the episode having a score indicating the smallest number of faces to label. For example, the number of faces of one episode may be fewer than the number of faces of another episode. The system may select the first video frames for face labeling when the score of the first video frames is less than the score of the second video frames.

At block 662, the system may present the selected first video frames for the first episode to a human operator, and may receive first face labels for first faces identified in the first video frames (e.g., the first faces representing the selected images of image clusters generated from the first video frames).

At block 664, the system may generate, based on a comparison of the first face labels to second faces in the second video frames, second face labels indicating actor names for the second video frames. The system may process all titles before generating an annotation job for human operators, and after selecting a first annotation job for human operators, the system may use the face labels from the first annotation job to generate a second annotation job. Once the second annotation job is complete, the system may use the face labels from the first two annotation jobs to create additional annotation jobs, one at a time until a complete season has been annotated. In one or more embodiments, after the first job is annotated, the system may select one of the remaining episodes for annotation, and may identify which episodes the remaining episode may be clubbed with to generate annotation jobs. The system may combine (e.g., merge) episodes which have a high overlap in the cast list together, ensuring that the individual annotation jobs remain easy for the manual operators. To avoid errors, human operators may verify faces with a predicted label as a verification task, which may be faster than the face-labeling task as long as the number of incorrect faces presented to the human operators is small.

At block 665, the system may send the second face labels to the human operator for verification (e.g., as shown in FIG. 4B). When the second face labels are correct, the human operator may send, and the system may receive, the verification. When any of the second face labels are incorrect, the human operator may send, and the system may receive, corrected face labels.

At block 666, the system may send the video frames and face labels (e.g., verified and/or corrected by the human operator) to another device (e.g., the one or more devices 502 of FIG. 5) for presentation. For example, the face labels may be presented concurrently with the video frames as supplemental information to identify the actors shown in the video frames.

The examples presented herein are not intended to be limiting.

Figure 7:
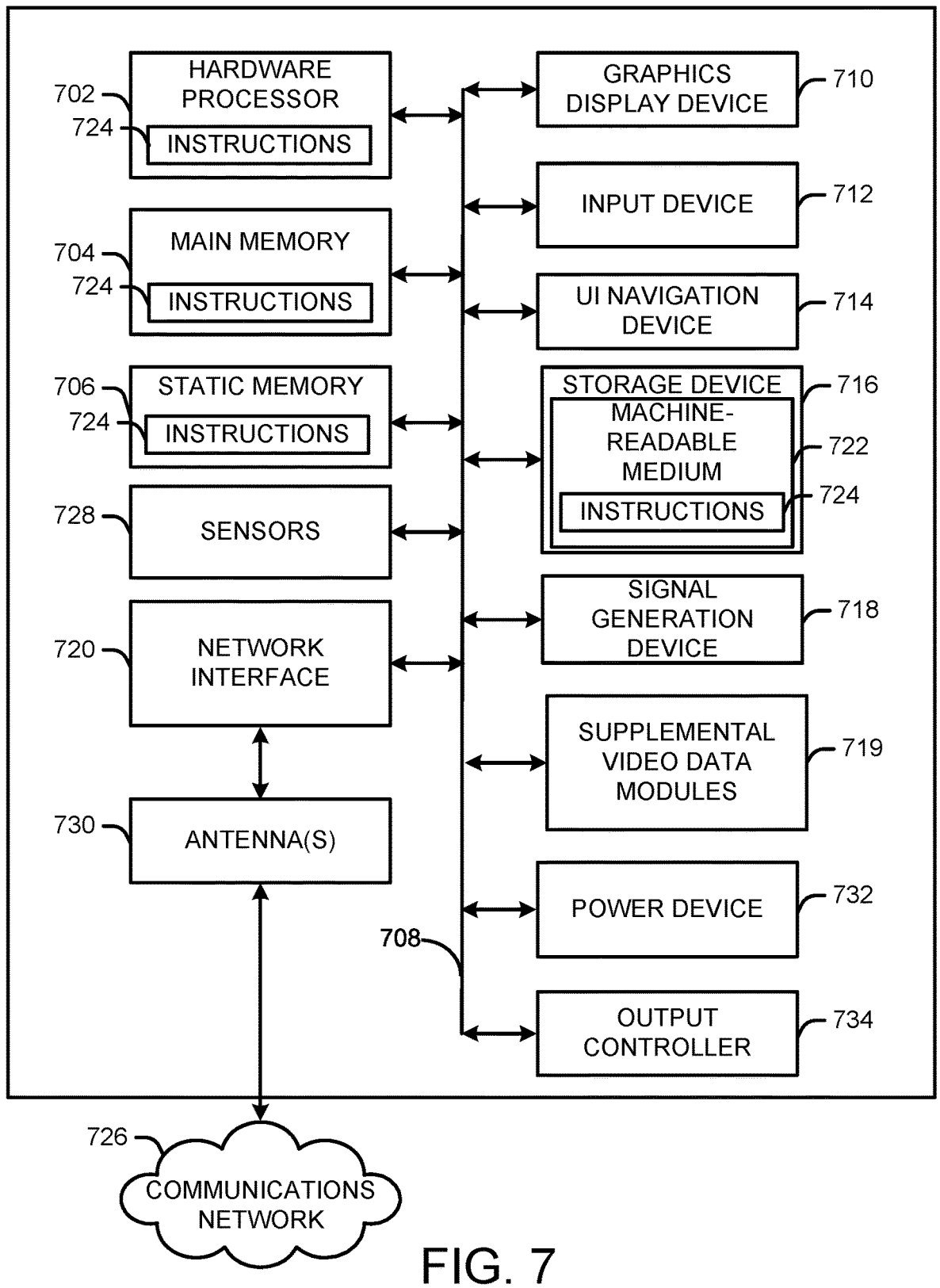
FIG. 7 illustrates a block diagram of an example machine upon which any of one or more techniques (e.g., methods) may be performed, in accordance with one or more example embodiments of the present disclosure.

FIG. 7 illustrates a block diagram of an example of a machine 700 (e.g., the device 104 of FIG. 1, the device 122 of FIG. 1, the one or more devices 502 of FIG. 5, the one or more devices 520 of FIG. 5, the one or more remote servers 504 of FIG. 5) or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in Wi-Fi direct, peer-to-peer (P2P) (or other distributed) network environments. The machine 700 may be a server, a media device, a remote control device, a streaming media device, a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a tensor processing unit (TPU) having an artificial intelligence accelerator application-specific integrated circuit (ASIC), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker, emitters, etc.), supplemental video data modules 719 (e.g., the image analysis modules 508 of FIG. 5, the annotation modules 510 of FIG. 5, the video streaming modules 512 of FIG. 5) a network interface device/transceiver 720 coupled to antenna(s) 730, and one or more sensors 728, such as photodiodes, accelerometers or other motion detection sensors, touch sensors, microphones, cameras, a global positioning system (GPS) sensor, a compass, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a media device, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The supplemental video data modules 719 may carry out or perform any of the operations and processes (e.g., process 600 of FIG. 6A, process 650 of FIG. 6B) described and shown above.

It is understood that the above are only a subset of what the supplemental video data modules 719 may be configured to perform and that other functions included throughout this disclosure may also be performed by the supplemental video data modules 719.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:
1. A method, comprising:
 identifying, by at least one processor of a first device, video frames of a television show having multiple seasons, the video frames including representations of unidentified actors;

identifying, using a convolutional neural network, faces represented by the video frames;
generating, by the at least one processor, based on a first episode of the television show, a first cluster of first faces of the faces;
generating, by the at least one processor, based on a second episode of the television show, a second cluster of second faces of the faces;
generating, by the at least one processor, based on a third episode of the television show, a third cluster of third faces of the faces;
determining, by the at least one processor, that a first cosine similarity between the first faces and the second faces exceeds a similarity threshold;
determining, by the at least one processor, that a second cosine similarity between the first faces and the third faces fails to exceed the similarity threshold;
selecting, by the at least one processor, based on the second cosine similarity, a first face to represent the first faces and the third faces;
selecting, by the at least one processor, based on the first cosine similarity, a second face to represent the second faces;
determining, by the at least one processor, a first score associated with the first episode, the first score indicative of a first number of faces to label using actor names, the first number of faces included in the first episode;
determining, by the at least one processor, a second score associated with the second episode, the second score indicative of a second number of faces to label using actor names, the second number of faces included in the second episode, the first score less than the second score;
selecting, by the at least one processor, based on a comparison of the first score to the second score, the first episode for face labeling;
sending, by the at least one processor, the first episode and the first face to a human operator;
receiving, by the at least one processor, from the human operator, a first face label for the first face, the first face label indicative of an actor's name;
generating, by the at least one processor, based on a comparison of the first face to a third face included in a fourth episode of the television show, a second face label for the third face, the second face label indicative of the actor's name;
sending, by the at least one processor, the third face and the second face label to the human operator;
receiving, by the at least one processor, from the human operator, a verification of the second face label; and
sending, by the at least one processor, the first face label and the second face label to a second device for presentation with the video frames.

2. The method of claim 1, further comprising:
determining the first number of faces to label based on the first episode and a fifth episode;
determining that the first number of faces to label is below a threshold number of faces; and
merging the first episode with the fifth episode,
wherein the first score is further associated with the fifth episode, and
wherein sending the first episode and the first face to the human operator further comprises sending the fifth episode to the human operator.

3. The method of claim 1, further comprising:
receiving, from the human operator, a third face label for a fourth face included in the first episode;
generating, based on a comparison of the fourth face to a fifth face represented by the video frames, a third face label for the fifth face, the third face label indicative of a second actor's name; and
sending the third face label to the second device for presentation with the video frames.

4. The method of claim 1, further comprising:
receiving, from the human operator, a third face label for a fourth face represented by the third episode, the third face label indicative of a second actor's name;
generating, based on a comparison of the fourth face to a fifth face represented by the video frames, a fourth face label for the fifth face, the fourth face label indicative of the second actor's name;
sending, the fifth face and the fourth face label to the human operator;
receiving, from the human operator, a verification of the fourth face label; and
sending the fourth face label to a second device for presentation with the video frames.

5. A method, comprising:
identifying, by at least one processor of a first device, first faces represented by first video frames of video frames, the video frames including representations of unidentified actors, the first faces comprising a first face;
identifying, by the at least one processor, second faces represented by second video frames of the video frames, the second faces comprising a second face;
determining, by the at least one processor, a first score associated with the first video frames, the first score indicative of a first number of faces to label using actor names, the first number of faces represented by the first video frames;
determining, by the at least one processor, a second score associated with the second video frames, the second score indicative of a second number of faces to label using actor names, the second number of faces represented by the second video frames, the first score less than the second score;
selecting, by the at least one processor, based on a comparison of the first score to the second score, the first video frames for face labeling;
receiving, by the at least one processor, from a human operator, a first face label for the first face, the first face label indicative of an actor's name;
generating, by the at least one processor, based on a comparison of the first face to the second face, a second face label for the second face, the second face label indicative of the actor's name; and
sending, by the at least one processor, the first face label and the second face label to a second device for presentation with the video frames.

6. The method of claim 5, further comprising:
sending the second face and the second face label to the human operator; and
receiving, from the human operator, a verification of the second face label,
wherein sending the first face label and the second face label to the second device is based on the verification.

7. The method of claim 5, further comprising:
determining that the first video frames comprise representations of the first face;
determining that the second video frames comprise representations of the second face;

determining that third video frames of the video frames comprise representations of a third face;
generating a first image cluster comprising the representations of the first face and the representations of the third face; and
generating a second image cluster comprising the representations of the second face,
wherein identifying the first faces is based on the first image cluster, and
wherein identifying the second faces is based on the second image cluster.

8. The method of claim 5, further comprising:
determining that a cosine similarity between the first faces and the second faces exceeds a similarity threshold;
selecting the first face as representative of the first faces;
selecting the second face as representative of the second faces; and
sending the first face and the second face to the human operator.

9. The method of claim 5, further comprising:
determining that a cosine similarity between the first faces and third faces represented by the video frames fails to exceed a similarity threshold;
selecting the first face as representative of the first faces and the third faces;
selecting the second face as representative of the second faces; and
sending the first face and the second face to the human operator.

10. The method of claim 5, further comprising:
determining a ranking of the first faces and third faces represented by the video frames, the ranking based on at least one of facial brightness, face pose, or face size;
selecting the first face to represent the first faces and the third faces based on the ranking; and
sending the first face to the human operator.

11. The method of claim 5, further comprising:
receiving, from the human operator, a third face label for a third face represented by the first video frames;
generating, based on a comparison of the third face to a fourth face represented by the video frames, a third face label for the fourth face, the third face label indicative of a second actor's name; and
sending the third face label to the second device for presentation with the video frames.

12. The method of claim 5, further comprising:
receiving, from the human operator, a third face label for a third face represented by the video frames, the third face label indicative of a second actor's name;
generating, based on a comparison of the third face to a fourth face represented by the video frames, a fourth face label for the fourth face, the fourth face label indicative of the second actor's name;
sending, the fourth face and the fourth face label to the human operator;
receiving, from the human operator, a verification of the fourth face label; and
sending the fourth face label to a second device for presentation with the video frames.

13. The method of claim 5, wherein the video frames are associated with a television show, wherein a first episode of the television show comprises the first video frames, wherein a second episode of the television show comprises the second video frames, and wherein sending the first video frames to the human operator comprises sending the first episode to the human operator with a request to identify an actor represented by the first face.

14. The method of claim 13, further comprising:
sending the second face and the second face label to the human operator for verification;
receiving, from the human operator, a verification of the second face label;
generating, based on a comparison of the second face to a third face represented by a third episode of the television show, a third face label for the third face, the third face label indicative of the actor's name;
sending the third face and the third face label to the human operator for verification; and
receiving, from the human operator, a verification of the third face label.

15. The method of claim 13, further comprising:
sending the second face and the second face label to the human operator for verification;
receiving, from the human operator, a third face label with which to replace the second face label; and
sending the third face label to the second device for presentation with the video frames.

16. The method of claim 5, further comprising:
identifying a third face represented by third video frames of the video frames;
determining that a cosine similarity between the first face and the third face exceeds a similarity threshold;
sending the third face to the human operator with a request to identify an actor represented by the third face;
receiving a third face label from the human operator, the third face label indicative of a second actor's name; and
sending the third face label to the second device for presentation with the video frames.

17. A system comprising memory coupled to at least one processor, the at least one processor configured to:
identify first faces represented by first video frames of video frames, the video frames including representations of unidentified actors, the first faces comprising a first face;
identify second faces represented by second video frames of the video frames, the second faces comprising a second face;
determine a first score associated with the first video frames, the first score indicative of a first number of faces to label using actor names, the first number of faces represented by the first video frames;
determine a second score associated with the second video frames, the second score indicative of a second number of faces to label using actor names, the second number of faces represented by the second video frames, the first score less than the second score;
select, based on a comparison of the first score to the second score, the first video frames for face labeling;
receive, from a human operator, a first face label for the first face, the first face label indicative of an actor's name;
generate, based on a comparison of the first face to the second face, a second face label for the second face, the second face label indicative of the actor's name; and
send the first face label and the second face label to a second device for presentation with the video frames.

18. The system of claim 17, wherein the at least one processor is further configured to:
send the second face and the second face label to the human operator; and
receive, from the human operator, a verification of the second face label, wherein to send the first face label and the second face label to the second device is based on the verification.

19. The system of claim 17, wherein the at least one processor is further configured to:
   determine that the first video frames comprise representations of the first face;
   determine that the second video frames comprise representations of the second face;
   determine that third video frames of the video frames comprise representations of a third face;
   generate a first image cluster comprising the representations of the first face and the representations of the third face; and
   generate a second image cluster comprising the representations of the second face,
   wherein to identify the first faces is based on the first image cluster, and
   wherein to identify the second faces is based on the second image cluster.

20. The system of claim 17, wherein the at least one processor is further configured to:
   determine that a cosine similarity between the first faces and the second faces exceeds a similarity threshold;
   select the first face as representative of the first faces;
   select the second face as representative of the second faces; and
   send the first face and the second face to the human operator.

* * * * *